May 18, 1937.  L. B. KIMBALL  2,080,488
MEANS FOR DE-ICING INTERNAL COMBUSTION ENGINE FUEL SUPPLY APPARATUS
Filed Oct. 11, 1935
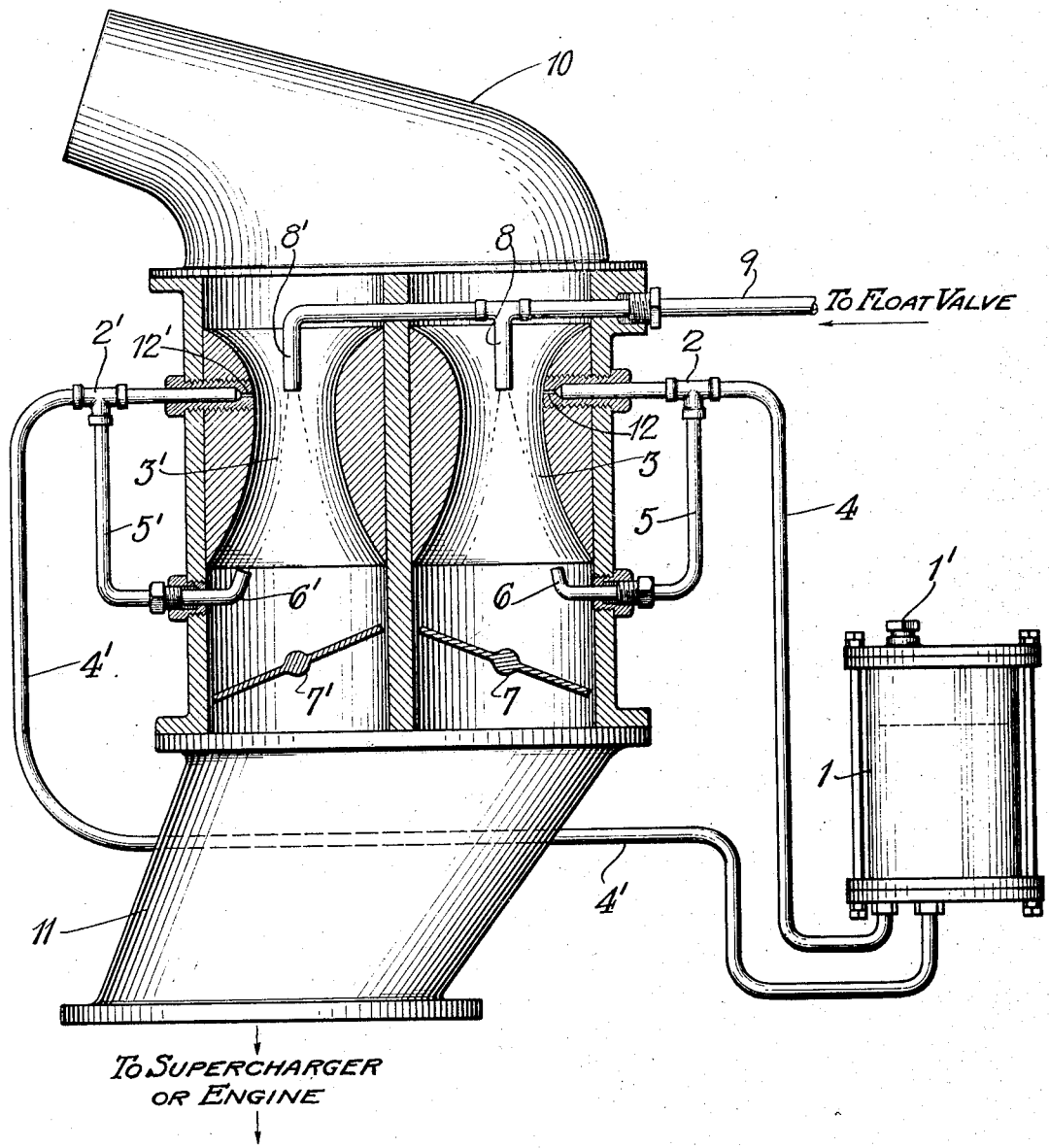
INVENTOR.
Leo B. Kimball.
BY Sheffield & Betts
HIS ATTORNEYS.

Patented May 18, 1937

2,080,488

UNITED STATES PATENT OFFICE 2,080,488

MEANS FOR DE-ICING INTERNAL COMBUSTION ENGINE FUEL SUPPLY APPARATUS

Leo B. Kimball, New Haven, Conn., assignor to Fuel Development Corporation, a corporation of Delaware Application October 11, 1935, Serial No. 44,493

3 Claims. (Cl. 261—18)

This invention relates to means for preventing the formation of ice in auxiliary apparatus used with internal combustion engines, particularly those of the airplane type.

It is the experience of airplane pilots, when flying airplanes at heights above the earth where the temperature is greatly reduced, that ice tends to form in the passages through which fuel is supplied to the engine owing to the presence of moisture either in the atmosphere or in the fuel itself. The accumulation of ice, if allowed to increase without means to prevent it, will ultimately reduce the size of the passages and interfere with flow of fuel mixtures through the carburetor, thereby reducing the desired power and often resulting in a forced landing, whereby the lives of passengers may be greatly endangered.

It has been found that if the accumulation of ice can be prevented at temperatures a few degrees above or a few degrees below the freezing point of water, other temperatures less than that will not be accompanied by the formation of ice on the metal surfaces that have been subjected to cold in the presence of moisture and if small quantities of ice or frozen water that have been deposited can be removed, any interference with the operation of the engine will be eliminated.

The fact that the presence of alcohol and other anti-freeze liquids will greatly reduce the freezing point of water enables its use for removing or preventing accumulations of ice in airplane apparatus to be particularly valuable.

To that end I have devised apparatus involving the use of anti-freeze liquid only at such times when the temperature of the fuel mixture is low enough to form ice on the metallic surfaces, at or in the vicinity of 32° F. or 0° C. At temperatures of such parts a few degrees above or below that point, no anti-freeze compound is required because ice is not deposited on the parts except within those limits.

For a detailed description of one form of device for carrying out my invention, reference may be had to the following specification taken in connection with the accompanying drawing, which is an elevational view, partly in section, showing schematically the apparatus used to control the supply of the anti-freeze liquid and the relation of said device to the carburetors of an internal combustion engine.

Referring to the drawing, the numeral 1 indicates a tank or container forming a reservoir or receptacle for anti-freeze liquid such as alcohol, 2 and 2' are devices for controlling the flow of such liquid, and 3 and 3' are the usual carburetors or mixing chambers for an internal combustion or other engine, illustrated as being of the "Venturi" type like those of the modern, so-called "down-draft" form. The carburetors are connected with the intake manifolds of the engine or with the supercharger therefor (not shown).

The device 2 comprises a small pipe or conduit 4 leading to the reservoir 1, and preferably entering the throat portion of the venturi of the carburetor or mixing chamber 3 where a small orifice 12 of sufficient size is provided to supply the necessary amount of anti-freeze liquid to remove any ice deposited. The device 2' comprises a similar pipe or conduit 4', preferably entering the throat of the Venturi portion of the carburetor or mixing chamber 3' and also connected with the reservoir 1. The conduits 4 and 4' communicate directly with branch conduits or pipes 5 and 5' which form by-passes and which extend from said conduits to points in the lower portions of the respective carburetors and preferably have slightly upturned ends, as indicated at 6 and 6'. These are preferably located above the throttle valves 7 and 7'. The shafts of the throttle valves are usually, as is well-known in the construction of airplane power devices, interconnected by gears (not shown) so that the throttle valves will be opened and closed simultaneously and to the same extent by the operation of a single control lever or other preferred control member.

The numerals 8 and 8' indicate the fuel jet nipples which supply the necessary fuel, such as gasoline, to drive the engine. The single feed pipe 9 from which the nipples project is obviously connected with the usual float valve chamber (not shown) to supply the necessary quantity of fuel under a practically uniform hydrostatic head. 10 indicates an air inlet for the carbuertors which in airplanes is often referred to as a "scoop" and 11 indicates the carburetor outlet connected with the engine or supercharger therefor. The reservoir 1 has a filling cap 1' preferably provided with a small vent.

The operation of the above-described device may be outlined as follows: Assuming that the throttle valves 7 and 7' are partly opened, so that the suction from the cylinders of the engine, or from the supercharger operated by the engine, causes a mixture of fuel and air to pass through the carburetors, reduced pressures are produced in the throats thereof.

Under ordinary conditions the suction or reduced pressures produced in the throats of the carburetors will cause the fuel mixture to pass through the tips 6 and 6' of the pipes 5 and 5' and no anti-freeze liquid will be caused to enter the carburetors because the pressure at 12 and 12' will be less than the pressure at 6 and 6' and will cause the fuel-air mixture to flow through the pipes 5 and 5'. The reduced pressure at 12 and 12' is then prevented from acting on the anti-freeze liquid to draw it from the pipes 4 and 4'. However, when the temperature of the inflowing air is reduced to a point in the vicinity of 32° F. or 0° C., ice will usually be formed within the carburetor and deposited upon its walls or the inner surfaces thereof and adjacent parts. Ice will consequently be formed over the tips 6 and 6' of the pipes 5 and 5' so as to seal them and stop the flow of fuel mixtures or gases therethrough.

Since the suction still exists in the throats of the Venturi portions of the carburetors, the anti-freeze liquid will then be drawn from the reservoir 1, through the pipes 4 and 4'. Said liquid will so be mixed with the incoming air and fuel and consequently with the moisture if and when carried thereby. That action will reduce the freezing point of the water of which the moisture is composed and will remove any ice that has accumulated. Furthermore, some of the anti-freeze liquid will ultimately be deposited on the ice which has closed the openings in the tips 6 and 6' of the pipes 5 and 5'. That action will cause the ice to melt and thus remove the seals over said openings and allow the mixture of fuel and air to pass through the tips 6 and 6' into the pipes 5 and 5', and will cause the reduced pressure or suction existing in the passages including the carburetors to allow the liquid in the pipes 4 and 4' to become inactive and so th supply of the anti-freeze liquid will be stopped until ice is again formed under substantially the same temperature conditions as above described.

Thus it will be appreciated that the above described procedure taking place in my de-icing device is applicable to a variety of devices for producing similar results set forth, as the operative effect of the new combination of parts illustrated in the drawing and described in this specification.

The action of the device described is the same whether or not two, or any other number of carburetors, are used with a airplane engine and it will be appreciated that the form of the device may be varied otherwise, without departing from the spirit and scope of my invention as set forth in the appended claims.

What I claim and desire to protect by Letters Patent is:

1. A device for the purpose stated, comprising, a casing having an air intake passage including a mixing chamber for fuel used in an internal combustion engine and a throttle valve, a container or reservoir for antifreeze liquid, a conduit therefrom to said passage for supplying said liquid thereto in advance of said mixing chamber, and a pipe connected between said mixing chamber and said conduit to form a by-pass which when open will prevent the flow of said liquid through said conduit, said pipe being made inoperative by the accumulation of ice in said passage and mixing chamber.

2. A device for the purpose stated, comprising, a carburetor for an internal combustion engine, a container forming a reservoir for anti-freeze liquid, a conduit therefrom to said carburetor for introducing said liquid into the throat of said carburetor, a branch pipe extending from said first conduit and entering said carburetor at a point in the outlet portion thereof, thereby preventing the flow of said anti-freeze liquid into the carburetor when ice is not formed therein.

3. A device for the purpose stated, comprising, a carburetor of the Venturi type, a container forming a reservoir for anti-freeze liquid, a conduit leading therefrom to said carburetor and connected with the reduced portion of said Venturi carburetor, a branch pipe extending from said first named conduit and entering said carburetor at a point adjacent the outlet of the Venturi portion thereof and having the end thereof extending in a direction contrary to the flow of the fuel mixture through the carburetor whereby the accumulation of ice on the end of said pipe will cause the flow of said anti-freeze liquid into the reduced portion of said carburetor.

LEO B. KIMBALL.